United States Patent
Fukasawa et al.

[11] Patent Number: 5,291,647
[45] Date of Patent: Mar. 8, 1994

[54] COMBINED PROCESSING MACHINE

[75] Inventors: Chiji Fukasawa, Kagamihara; Shunitsu Itou, Ichinomiya; Hiroshi Kobayashi, Aichi, all of Japan

[73] Assignee: Murata Kikai Kabushiki Kaisha, Kyoto, Japan

[21] Appl. No.: 41,816

[22] Filed: Apr. 1, 1993

[30] Foreign Application Priority Data

Apr. 3, 1992 [JP] Japan .................. 4-112121

[51] Int. Cl.$^5$ .................. B23Q 5/22; G05B 13/00
[52] U.S. Cl. .................. 29/564; 33/504;
33/702; 83/522.17; 83/552; 219/121.7
[58] Field of Search ............ 29/33 R, 564, 563, 33 P, 29/33 Q; 33/702, 710, 642, 628, 504; 318/632, 634; 409/135, 134, 218; 83/522.11, 522.12, 522.13, 522.14, 522.15, 522.16, 522.17, 522.22, 552; 219/121.67, 121.7, 121.78

[56] References Cited

U.S. PATENT DOCUMENTS

| | | | |
|---|---|---|---|
| 3,614,909 | 10/1971 | Neuser | 33/628 |
| 4,106,183 | 8/1978 | Brolunde et al. | 29/564 |
| 4,195,250 | 3/1980 | Yamamoto | 318/632 X |
| 4,728,232 | 3/1988 | Babel | 409/135 |
| 4,912,856 | 4/1990 | Ernst | 33/702 |
| 5,142,792 | 9/1992 | Nelle | 33/702 |

FOREIGN PATENT DOCUMENTS

| | | | |
|---|---|---|---|
| 47853 | 3/1982 | European Pat. Off. | 318/632 |
| 3314748 | 10/1984 | Fed. Rep. of Germany | 29/564 |
| 89459 | 7/1981 | Japan | 33/504 |

Primary Examiner—William Briggs
Attorney, Agent, or Firm—Spensley Horn Jubas & Lubitz

[57] ABSTRACT

In a combined processing machine provided with a punching press mechanism and a laser head, a detector such as an electric micrometer is mounted on a cross slide provided for moving a workpiece on a work table with the aid of a work piece holder. The detector is made to come into contact with the rear face of the upper turret and subsequently with the laser head and measures the deviation of the punching position and the laser processing position.

6 Claims, 4 Drawing Sheets

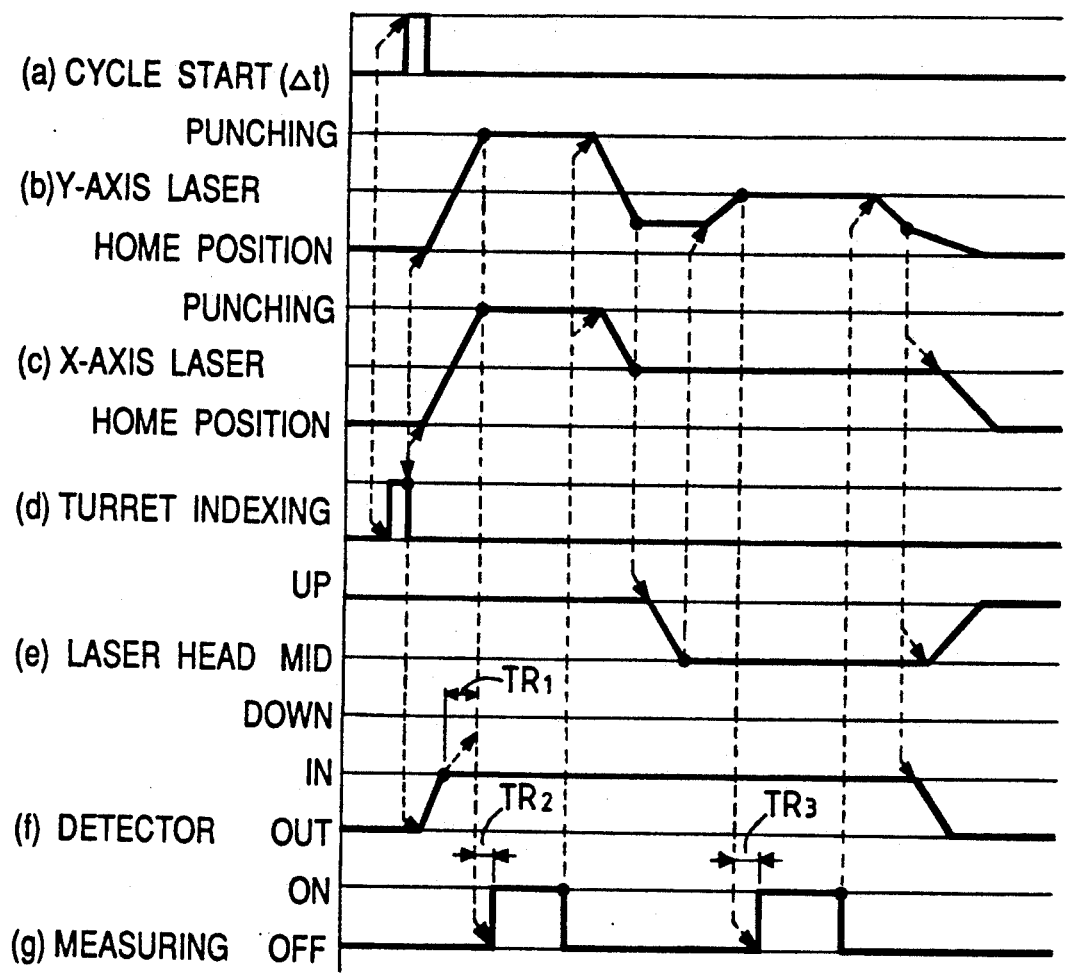

COMBINED PROCESSING MACHINE

BACKGROUND OF THE INVENTION

Field of the Invention

This invention relates to a combined processing machine provided with a punching press mechanism and a laser head.

Related Art Statement

Conventionally, a combined processing machine which mounts a laser head on a turret punching press machine is known. With such a combined processing machine, a punching processing and laser processing are both effected on a same workpiece. Namely, an aperture is formed in the workpiece by the punching processing and then the workpiece is subject to the laser processing.

In a plate processing machine such as a punching press or a laser processing machine, due to the change of ambient temperature or a heat generated during running of these machines, the frame, work tables and feed screws are subject to the thermal expansion. This thermal expansion gives rise to errors in terms of the punching position or the laser processing position. This is especially true with the above-mentioned combined processing machine where each part is to be produced by the punching processing and the laser processing. In such a processing, the precision of processing is drastically lowered owing to the occurrence of deviation on the punching position and the laser processing position.

Therefore, conventionally, several means or methods have been proposed to correct such a thermal deviation. For example, one method employs contact sensors for measuring the deviation of the turret and the laser head. The method, however, necessitates a drive mechanism exclusive for moving the contact sensors so that the construction of the entire assembly becomes complicated thus making the assembly extremely expensive.

OBJECT AND SUMMARY OF THE INVENTION

It is an object of the present invention to provide a combined processing machine which has a simple construction and yet can measure the deviation of the punching position and the laser processing position and thereby correct the deviation as a whole assembly.

This invention discloses a combined processing machine provided with a punching press mechanism and a laser head characterized in that a detector which measures a deviation of a position in place adjacent to a punching position of the punching press mechanism and a deviation of the laser head is mounted on a cross head which supports a workpiece holder. The cross slide is reciprocably movable on a work table and the work table is commonly utilized by the punching press mechanism and the laser head.

Owing to the above-mentioned construction, the detector can be moved along with the movement of the cross slide for moving the workpiece and the deviation of the position adjacent to the punching position as well as the deviation of the laser head can be measured.

BRIEF DESCRIPTION OF THE DRAWINGS

FIG. 8 is a timing chart of the measuring operation.

DETAILED DESCRIPTION OF PREFERRED EMBODIMENT

Figure 1:
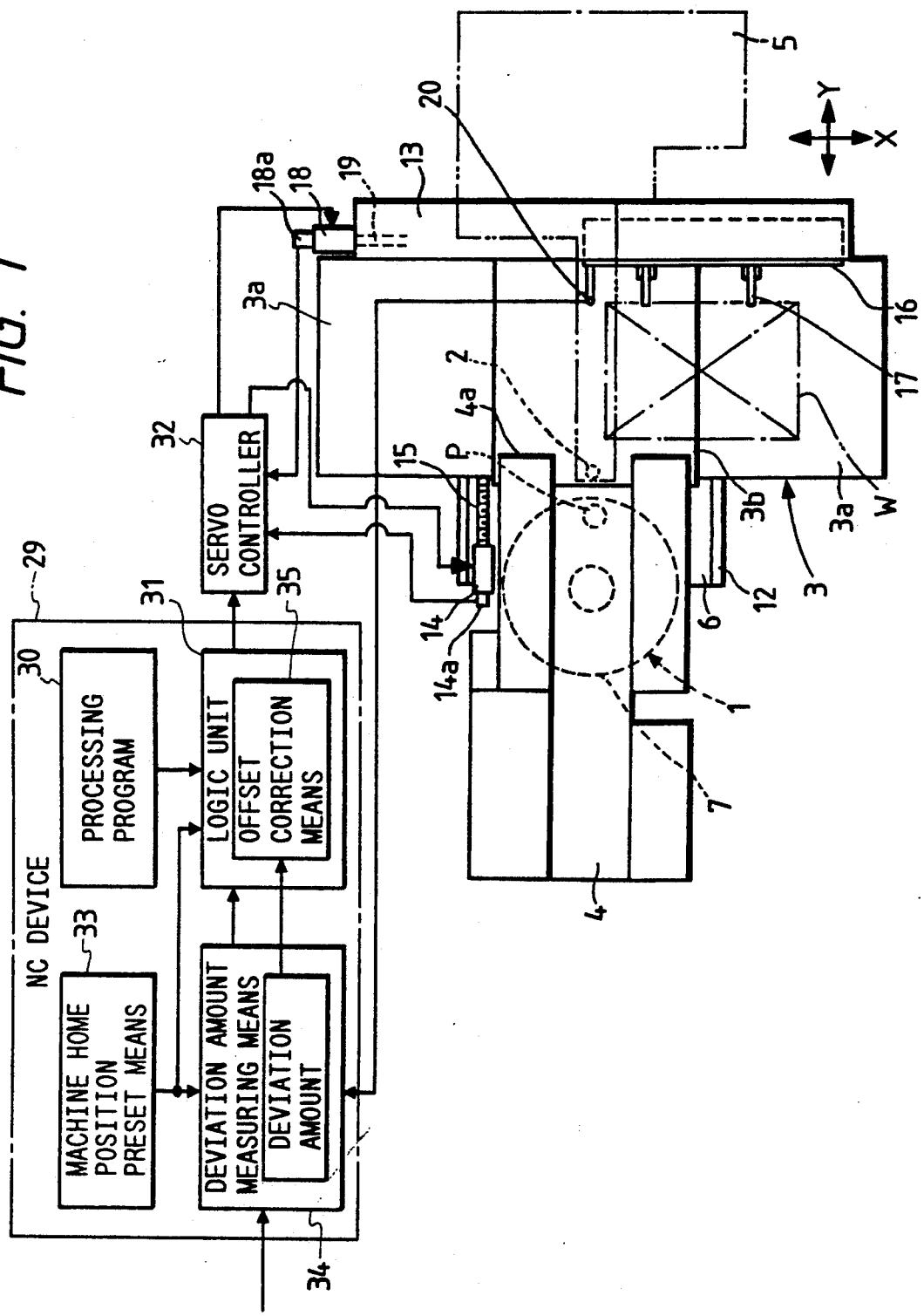
FIG. 1 is a schematical view showing the plan view of the combined processing machine according to this invention and the functional block diagram of the combined processing machine.
Figure 2:
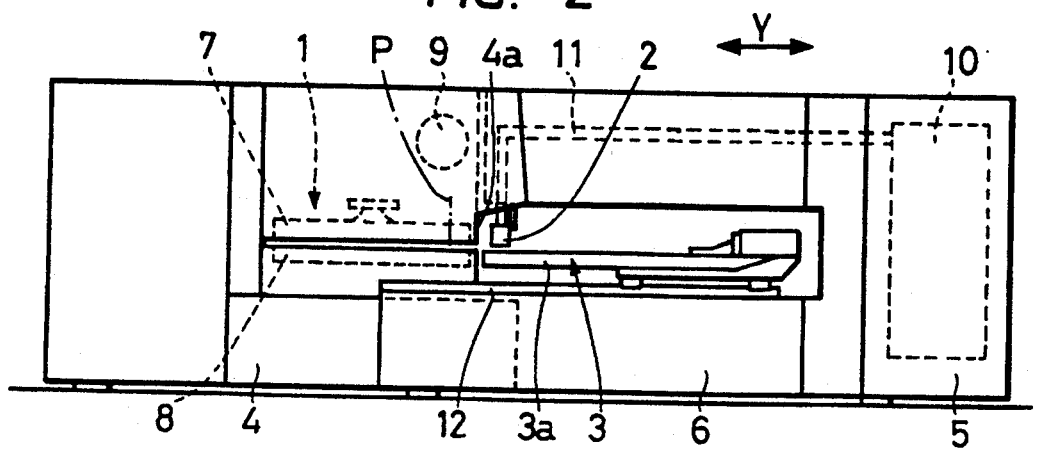
FIG. 2 is a side view of the combined processing machine.
Figure 3:
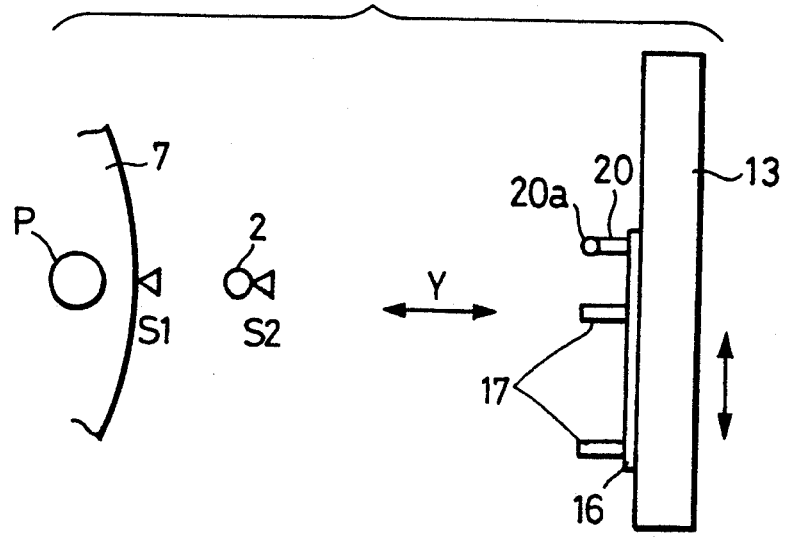
FIG. 3 is an explanatory view showing the manner of measuring operation.

One embodiment of this invention is explained in conjunction with FIG. 1 to FIG. 8. As shown in FIG. 2, a combined processing machine according to this invention is provided with a punching press mechanism 1 and a laser head 2 which are disposed in place relative to a common work table 3. The frame of the combined processing machine is made of a punching press mounting frame 4, a laser processing machine mounting frame 5 and a table mounting frame 6.

The punching press mechanism 1 is provided with a plurality of punching tools and dies (not shown in the drawings) which are arranged on the outer periphery of an upper and lower turrets 7 and 8. These turrets 7 and 8 synchronously rotate while making indexing and the punching tool which is indexed at a punching position is elevated by a crank mechanism 9.

The laser head 2 is provided with a focusing optical system and a nozzle for supplying an assist gas (both not shown in the drawings) and these are mounted on a distal end of the laser processing machine mounting frame 5 which is slightly away from the punching position P in a rearward direction (Y direction). To the laser head, a laser beam which is oscillated at a laser oscillator 10 is fed by way of a bend mirror and passing through a laser guide sleeve 11. The laser head 2 is also provided with an elevation drive mechanism which can retract the laser head 2 or carry out the focus adjustment.

As shown in FIG. 1, the work table 3 is made of a pair of left and right slide tables 3a which are movable in a frontward or backward direction and a central fixed or stationary table 3b. The slide tables 3a are both reciprocably movable along with a rear carriage 13 by the actuation of a Y-axis servo motor 14 and a feed screw 15. The cross slide 16 is mounted on the carriage 13 in such a manner that the cross slide 16 is movable in a lateral direction (namely, X direction), while a plurality of workpiece holders 17 which hold the plate-like workpiece W are mounted on the cross slide 16 respectively. The cross slide 16 is reciprocably movable by the actuation of an X-axis servo motor 18 and a feed screw 19 which are mounted on the carriage 13.

With such a basic construction, a detector 20 for detecting the deviation of a punching position and a deviation of the laser head 2 is mounted on the cross slide 16. An electric micrometer is used as the detector 20.

Figure 4:
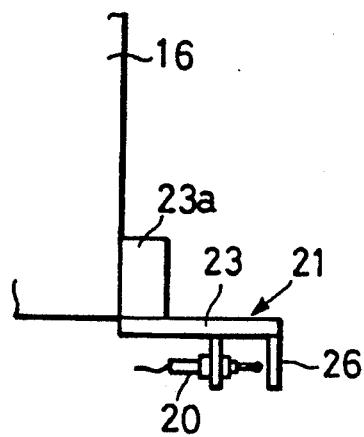
FIG. 4 is a plan view showing the detector mounted on the cross slide.
Figure 5:
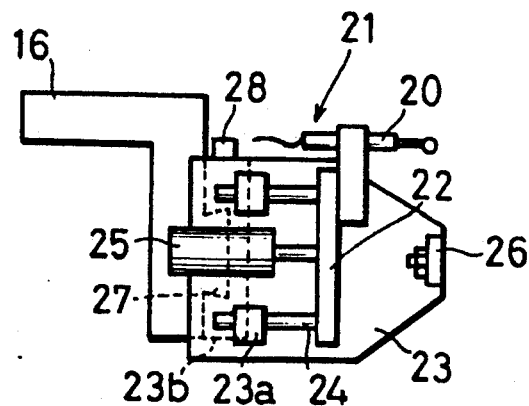
FIG. 5 is a side view of a detector retracting mechanism.
Figure 6:
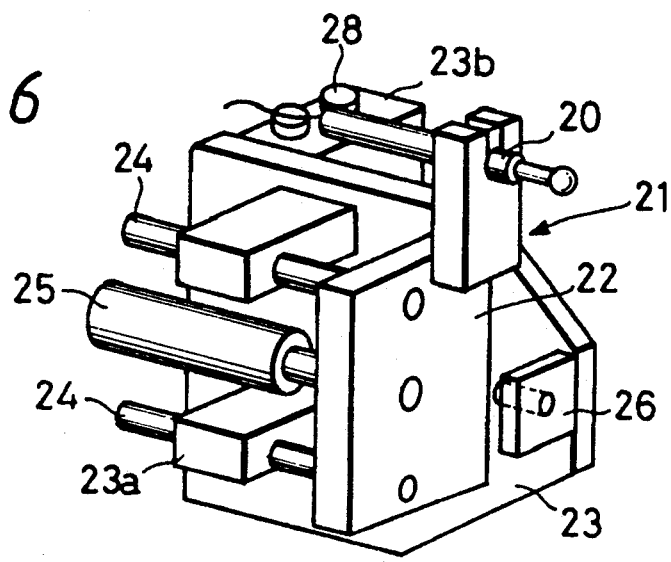
FIG. 6 is a perspective view of detector retracting mechanism.

As shown in FIG. 4 to FIG. 6, the detector 20 is mounted on the cross slide 16 by way of a detector retracting mechanism 21 so that during the processing operation, an accident that the detector 20 comes into contact with a plan cover 4a which covers the upper turret 7 of the punching press mounting frame 4 can be obviated. The plan cover 4a is provided with a notch or a recess (not shown in the drawings) for preventing the interference with the detector 20 at the time of measurement. FIG. 4 to FIG. 6 are described as a mirror image relative to FIG. 1 in terms of the arrangement of assembly.

The detector retracting mechanism 21 is constructed as follows. A pair of guide rods 24 are reciprocably supported by a mounting plate 23 by means of guide portions 23a and a reciprocating member 22 is reciprocably mounted on a pair of guide rods 24 and the detector 20 is mounted on this reciprocating member 23. The reciprocating member 22 is reciprocably moved upon actuation of a pneumatic cylinder 25 which is mounted on the mounting plate 23. A stopper 26 provided with an adjusting screw regulates or determines an 'IN' position (a detecting position). The mounting plate 23 is provided with a mounting block 23b and this mounting block 23b is engaged with a workpiece holder mounting plate 27 having a dovetail configuration (FIG. 5) which is formed in the cross slide 16. The mounting block 23b and the workpiece holder mounting plate 27 are fixed together by a fastening bolt 28.

The control system is explained in view of FIG. 1. A NC device (numerical control device) 29 is provided as a means for controlling the entire system of the combined processing machine and comprises an NC functional unit and a programmable controller functional unit. The NC device 29 is provided with an arithmetic or logic unit 31 which outputs axial-direction shaft feeding signals so as to drive an Y-axis servo motor 14 and a X-axis servo motor 18 by way of a servo controller 32. The servo motors 14, 18 are respectively provided with position detectors 14a, 18a which are made of pulse coders and the like and the detected values are fedback to the servo controller 32. The logic unit 31 includes an offset correction means 35 for correcting the axial-direction feeding signals to X-axis and Y-axis corresponding to the offset amount preset at the logic unit 31.

In a desired storage area of a memory device of the NC device 29, a machine home position preset means 33 and a deviation amount measuring means 34 are provided wherein the machine home position preset means 33 stores the machine home position in terms of X-axis and Y-axis.

The deviation measuring means 34 comprises programs executed by the logic unit 31 such as a program which controls the operation of the cross slide 16 for enabling the detection of the detector 20 and an arithmetic program for taking in deviation values measured by the detector 20 at a desired time and processing the deviation amount.

The measurement of the thermal deviation and the manner of correcting the deviation with the above-mentioned construction are explained hereinafter. To briefly explain the operation in conjunction with FIG. 3, a contactor 20a of the detector 20 which is mounted on the cross slide 16 is first made to come into contact with a rear-side position S1 on the outer periphery of the upper turret 7 and then is made to come into contact with a rear-side position S2 of the laser head 2. With this operation, the thermal deviation of the punching position P and the laser processing position relative to the cross slide 16 is measured. This measuring operation is carried out at a time the machine home position is predetermined and thereafter the measuring operation is carried out at regular intervals or is carried out during the running of the combined processing machine or when the combined processing machine is out of running in response to the outer information generated by the result of the temperature measurement. The measured value of the second measurement as well as the subsequent measurement are compared with the measured values at the time of determining the home position, and the differential is input to the offset correction means 35 of the logic unit 31. The machine home position is preset after the completion of the adjustment of the detector which is carried out after mounting thereof or at the time of turning on the power source switch.

Figure 7:
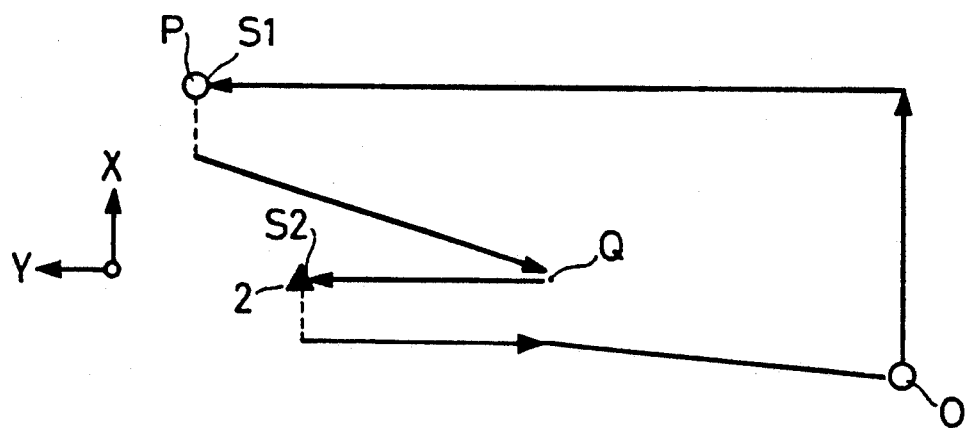
FIG. 7 is an explanatory view of the detector moving path during the measuring operation.

In FIG. 7, the sequence of operation is shown, while in FIG. 8, the timing of the operation is shown. FIG. 8 shows the operation of the second time and subsequent times. The operation of the first time is started regardless of the presence of the cycle starting signal of (a).

The cycle starting signal of FIG. 8 (a) is generated when the temperature data such as ambient temperature exceeds a preset value. Corresponding to the generation of the cycle starting signal, the indexing of the turrets 7 and 8 is carried out. Subsequently, the detector 20 is moved to the punching position (turret rear-side position S1) as a resultant movement of the Y-axis movement and X-axis movement. The detector 20 is advanced to the IN position (measuring position) from the OUT position (retracted position) by means of the detector retracting mechanism 21 during the above movement.

When the detector 20 comes into contact with the rear-side S1 of the upper turret 7, the deviation amount measured by the detector 20 is stored by the deviation measuring means 34 as the measured value of the punching position P. Then the detector 20 is retracted to an intermediate return position Q (FIG. 7), and the laser head 2 is lowered to a down position and the detector 20 is again advanced to make the detector 20 come into contact with the laser head 2. At the time of contact, the deviation amount measured by the detector 20 is stored by the deviation measuring means 34 as a measured deviation amount of the punching position P. Subsequently, the detector 20 returns to the home position O. $TR_1$ to $TR_3$ are queue time for increasing the reliability of the operations. However, such a queue time can be reflected.

In this manner, the punching position P and the current position of the laser head are detected and the detected value is compared with the measured value of the first embodiment and the thermal deviation amount at respective positions are detected. With this thermal deviation amount, the feed amount is corrected as a Y-axis offset.

Since the measured value of the above thermal deviation includes the deviation of machining part (punching position P and the laser head) as well as the deviation of movable part such as Y-axis feeding shaft 15 which are both caused by the thermal expansion of the frame, the thermal deviation can be corrected including both the thermal deviation of the frame and the thermal deviation of the feeding screw. Therefore, the precision or the accuracy of the correction is enhanced.

Furthermore, since the detector 20 is mounted on the cross slide 16 which is provided for feeding the workpiece, any mechanism employed exclusively for moving the sensor becomes unnecessary, thereby the construction for detecting the deviation can be simplified.

Although, the embodiment is explained with respect to the combined processing machine provided with the turret-type punching press mechanism 1, this invention is applicable to a combined processing machine provided with any other type of punching press mechanism. Furthermore, the measuring operations or method which is applicable to the present invention is not limited to those explained with respect to the present invention, but includes various other kinds of measuring methods or correction methods which utilizes the detector 20 mounted on the cross slide 16.

The combined processing machine according to this invention is provided with a detector which is mounted on the cross slide for moving the workpiece and the detector measures the deviation of a position adjacent to the punching position and the deviation of the laser head. Accordingly, any mechanism exclusively used for moving the sensor can be unnecessitated and the measurement of the deviation at a desired position can be measured with a device of a simple construction and the precision of the processing or machining is enhanced.

What we claim is:

1. A combined processing machine in which a punching press mechanism and a laser head are mounted on a common work table and a workpiece holder is mounted on a cross slide which is reciprocably movable on said work table, the improvement is characterized in that a detector for measuring a deviation of a position in place adjacent to a punching position of said punching press mechanism and a deviation of said laser head is mounted on said cross slide.

2. A combined processing machine as claimed in claim 1, wherein said detector comprises an electric micrometer.

3. A combined processing machine as claimed in claim 1, wherein said detector is mounted on the cross slide by way of a detector retracting mechanism.

4. A combined processing machine as claimed in claim 3, wherein said detector retracting mechanism comprises a mounting plate secured on a workpiece holder mounting plate which is formed in the cross slide, a reciprocating member which is reciprocably mounted on a pair of guide rods supported by the mounting plate and mounts the detector, and a stopper for regulating a detecting position, said reciprocating member being reciprocably moved upon actuation of a pneumatic cylinder which is mounted on the mounting plate.

5. A combined processing machine as claimed in claim 1, wherein said combined processing machine provides a NC device and said NC device is provided with a logic unit for executing the processing program, an offset correction means for correcting an axial direction feeding signal to X-axis and Y-axis corresponding to the offset amount preset at the logic unit, a machine home position preset means for storing the machine home position in terms of X-axis and Y-axis, and a deviation amount measuring means comprising programs executed by the logic unit.

6. A combined processing machine as claimed in claim 5, wherein said deviation measuring means comprises a program which controls the operation of the cross slide for enabling the detection of the detector and an arithmetric program for taking in deviation values measured by the detector and processing the deviation amount.

* * * * *